United States Patent
Zommer (10) Patent No.: US 8,986,621 B2
(45) Date of Patent: Mar. 24, 2015

(54) METHODS AND APPARATUSES FOR CONVERTING CARBON DIOXIDE AND TREATING WASTE MATERIAL

(75) Inventor: Nathan Zommer, Fort Lauderdale, FL (US)

(73) Assignee: IXYS Corporation, Milpitas, CA (US)

( * ) Notice: Subject to any disclaimer, the term of this patent is extended or adjusted under 35 U.S.C. 154(b) by 525 days.

(21) Appl. No.: 12/788,607

(22) Filed: May 27, 2010

(65) Prior Publication Data

US 2010/0307912 A1 Dec. 9, 2010

Related U.S. Application Data

(60) Provisional application No. 61/183,871, filed on Jun. 3, 2009.

(51) Int. Cl.
*B01J 19/08* (2006.01)
*B01D 50/00* (2006.01)
*B01D 53/00* (2006.01)
(Continued)

(52) U.S. Cl.
CPC ............ *B01J 19/085* (2013.01); *B01D 53/007* (2013.01); *B01D 53/62* (2013.01); *C01B 31/24* (2013.01); *C01D 7/07* (2013.01); *C01D 7/18* (2013.01); *C01F 5/24* (2013.01); *C01F 11/18* (2013.01);
(Continued)

(58) Field of Classification Search
CPC ......... B01J 19/085; C01B 31/24; C01D 7/18; C01D 7/07; C01F 5/24; C01F 11/18; B01D 53/007; B01D 53/62; B01D 2259/812; Y02C 10/04

USPC ............... 204/157.47; 588/305; 422/186, 168
See application file for complete search history.

(56) References Cited

U.S. PATENT DOCUMENTS 1,282,799 A * 10/1918 Frasch ......................... 423/423
3,901,807 A * 8/1975 Trump ......................... 422/187
(Continued)

FOREIGN PATENT DOCUMENTS

JP 2000-202233 A 7/2000
JP 2001170201 A * 6/2001
(Continued)

OTHER PUBLICATIONS

EB Tech, Wastewater Treatment System products page, as printed from www.eb-tech.com/products/wastewater.html, pp. 1-2, (2000).
(Continued)

*Primary Examiner* — Colleen M Raphael
(74) *Attorney, Agent, or Firm* — Imperium Patent Works; Amir V. Adibi (57) ABSTRACT

Methods and apparatuses for converting carbon dioxide and treating waste material using a high energy electron beam are disclosed. For example, carbon dioxide and an aqueous reaction solution having a reactant can be combined to form an aqueous reaction mixture, and the aqueous reaction mixture can then be subjected to a high energy electron beam that initiates a reaction between carbon dioxide and the reactant to form a reaction product. Solid or liquid waste material can be treated by, for example, combining carbon dioxide and a solid or liquid waste material having a reactant and then subjecting the carbon dioxide and solid or liquid waste material having a reactant to a high energy electron beam to initiate a reaction between the carbon dioxide and the reactant to form a reaction product.

26 Claims, 9 Drawing Sheets (51) Int. Cl.
*B01D 53/62* (2006.01)
*C01B 31/24* (2006.01)
*C01D 7/07* (2006.01)
*C01D 7/18* (2006.01)
*C01F 5/24* (2006.01)
*C01F 11/18* (2006.01)

(52) U.S. Cl.
CPC ..... *B01D 2257/504* (2013.01); *B01D 2259/812* (2013.01); *Y02C 10/04* (2013.01)
USPC .......................................... 422/186; 422/168

(56) References Cited

U.S. PATENT DOCUMENTS

| | | | | |
|---|---|---|---|---|
| 4,172,019 | A | * | 10/1979 | Woodbridge ................. 422/186 |
| 4,336,277 | A | * | 6/1982 | Bunshah et al. .............. 204/193 |
| 4,448,802 | A | * | 5/1984 | Buhl et al. ................ 204/298.41 |
| 4,643,852 | A | * | 2/1987 | Koslow ......................... 422/231 |
| 4,748,005 | A | * | 5/1988 | Neuberg et al. ............... 422/186 |
| 4,752,450 | A | * | 6/1988 | Dietrich et al. ............... 422/186 |
| 4,943,356 | A | * | 7/1990 | Dietrich ..................... 204/157.3 |
| 5,015,443 | A | * | 5/1991 | Ito et al. ........................ 422/186 |
| 5,258,124 | A | | 11/1993 | Bolton et al. |
| 5,357,291 | A | * | 10/1994 | Schonberg et al. ........... 422/186 |
| 5,370,845 | A | * | 12/1994 | Miller et al. ................. 422/186.3 |
| 5,457,269 | A | * | 10/1995 | Schonberg ............... 204/157.44 |
| 5,762,808 | A | | 6/1998 | Peyton |
| 5,770,785 | A | * | 6/1998 | Tamura et al. ................. 422/186 |
| 5,834,722 | A | * | 11/1998 | Tokunaga et al. ............. 422/186 |
| 6,083,387 | A | * | 7/2000 | LeBlanc et al. ............. 422/186.3 |
| 6,242,664 | B1 | * | 6/2001 | Crihan .......................... 588/305 |
| 6,432,279 | B1 | * | 8/2002 | Zanta ......................... 204/157.5 |
| 6,696,693 | B1 | * | 2/2004 | Naitoh ....................... 250/492.3 |
| 6,852,200 | B2 | | 2/2005 | LaBarge et al. |
| 6,878,349 | B2 | * | 4/2005 | Bianco et al. ............. 422/186.04 |
| 7,255,842 | B1 | | 8/2007 | Yeh et al. |
| 2003/0009075 | A1 | * | 1/2003 | Zante ............................ 422/186 |
| 2008/0116054 | A1 | | 5/2008 | Leach et al. |
| 2008/0283411 | A1 | | 11/2008 | Eastman et al. |

FOREIGN PATENT DOCUMENTS

| | | | |
|---|---|---|---|
| JP | 2003062115 A | * | 3/2003 |
| WO | WO 01/97954 | | 12/2001 |

OTHER PUBLICATIONS

Search Report by the European Patent Office in the related European Patent Application No. 10783832.8 dated Jun. 25, 2014 (6 pages).

* cited by examiner

METHODS AND APPARATUSES FOR CONVERTING CARBON DIOXIDE AND TREATING WASTE MATERIAL

CROSS-REFERENCES TO RELATED APPLICATIONS

The present application claims priority to U.S. Provisional Patent Application No. 61/183,871, filed on Jun. 3, 2009, which is incorporated by reference in its entirety.

TECHNICAL FIELD

This invention relates to the treatment of carbon dioxide and other waste gases involved in treating waste material. More particularly, the methods and apparatuses of the invention can be used to convert carbon dioxide to useful materials for industrial and commercial applications and to treat solid and liquid waste materials.

BACKGROUND

Carbon dioxide ($CO_2$) emissions are the major contributor to the global green house effect. It has been estimated that carbon dioxide emissions exceed 30 gigatons annually. Power generation is the largest source of carbon dioxide emissions, followed by industrial production and transportation. Coal is the lowest cost option to meet the growing demand for electricity. However, coal based power plants emit more carbon dioxide than other sources of electricity. Thus, the capture, compression, and transport of carbon dioxide from fossil fuel burning electrical power plants results in higher costs and higher operating demands of equipment, manpower and logistics to enable the plants to operate in accordance with environmental regulations and restrictions. After capturing the carbon dioxide, the carbon dioxide can be stored in sites such as caves, former oil fields, former salt mines, or any other available underground or underwater storage sites. However, when storing carbon dioxide at such sites, there is no guarantee that the carbon dioxide will not leak back to the atmosphere. Therefore, it is desirable to have more effective measures for disposing of carbon dioxide.

A similar concern regarding waste gases other than carbon dioxide arises during bio-digesting processes (e.g., at waste treatment facilities or garbage dump sites), where the processed waste material can emit gases, such as methane and ammonia. Thus, it is desirable to treat these gases and other reactants in solid or liquid waste.

SUMMARY

Embodiments of the present invention provide methods and apparatuses for converting carbon dioxide and treating waste material. For example, methods of the invention include converting carbon dioxide emissions to materials that can be used in industrial and commercial applications. Disclosed embodiments can be utilized at a facility where carbon dioxide emissions occur without the need to transport captured carbon dioxide offsite. As a result of the carbon dioxide conversion, a plant that emits carbon dioxide can transform its polluting liability into an income-producing asset. Alternatively, methods and apparatuses that embodiment aspects of the present invention can be used in treating solid and/or liquid waste material. The methods and apparatuses in accordance with the present invention use high energy electron beams ("EB") as a main activator, trigger and energy source for the chemical and physical reactions that can lead to conversion of carbon dioxide and treatment of waste material.

Embodiments can include a method of converting carbon dioxide including forming an aqueous reaction mixture by combining carbon dioxide and an aqueous reaction solution having a reactant, and subjecting the aqueous reaction mixture to a high energy beam that can initiate a reaction between carbon dioxide and the reactant to produce a reaction product. Enhancements of the embodiments can include bubbling carbon dioxide into an aqueous reaction solution or mixed slurry having a base, and initiating a reaction with an electron beam between carbon dioxide and the base to form a carbonate, a bicarbonate, or a combination thereof. Enhancements of the embodiments can also include combining carbon dioxide, ammonia, and an aqueous reaction solution or mixed slurry having water and sodium chloride, and initiating a reaction with an electron beam to form sodium bicarbonate and ammonium chloride.

Embodiments can include a method of treating a solid or liquid waste material including receiving solid or liquid waste material having a reactant, combining the waste material with carbon dioxide, and initiating a reaction with an electron beam between carbon dioxide and the reactant in the waste material. Enhancements of the embodiments can include solid or liquid waste material that emits methane and reacting methane with carbon dioxide to form ethanol and oxygen. Enhancements of the embodiments can also include solid or liquid waste material that emits methane and ammonia, and reacting methane, ammonia, carbon dioxide, and sodium chloride to form sodium bicarbonate, ammonium chloride, ethanol and oxygen.

Embodiments of the invention can include an apparatus for treating waste. Enhancements of the embodiments can include a reaction apparatus having an inlet port to provide carbon dioxide, an injection port to inject material (e.g., an aqueous solution or solid or liquid waste material), a mixing chamber connected to the inlet port and injection port, a mixing rotor to mix carbon dioxide and the injected material, a reaction chamber, a high energy beam positioned so as to irradiate carbon dioxide and the injected material in the reaction chamber, and an outlet port connected to the reaction chamber. Enhancements of the embodiments include a reaction chamber having a reservoir and/or access port to collect and remove reaction product.

A further understanding of the nature and advantages of the present invention can be realized by reference to the remaining portions of the specification and the drawings.

DETAILED DESCRIPTION

I. General

Embodiments of the invention provide methods and apparatuses for converting carbon dioxide and treating waste material using a high energy electron beam. In some embodiments, carbon dioxide and an aqueous reaction solution having a reactant can be combined to form an aqueous reaction mixture, and the aqueous reaction mixture can then be subjected to a high energy electron beam that initiates a reaction between carbon dioxide and the reactant to form a reaction product. In other embodiments, solid or liquid waste material can be treated by, for example, combining carbon dioxide and a solid or liquid waste material having a reactant and then subjecting the carbon dioxide and solid or liquid waste material having a reactant to a high energy electron beam to initiate a reaction between the carbon dioxide and the reactant to form a reaction product. In certain embodiments, the reactions can be carried out in an apparatus according to the present invention for converting carbon dioxide and/or treating waste.

Figure 1A:
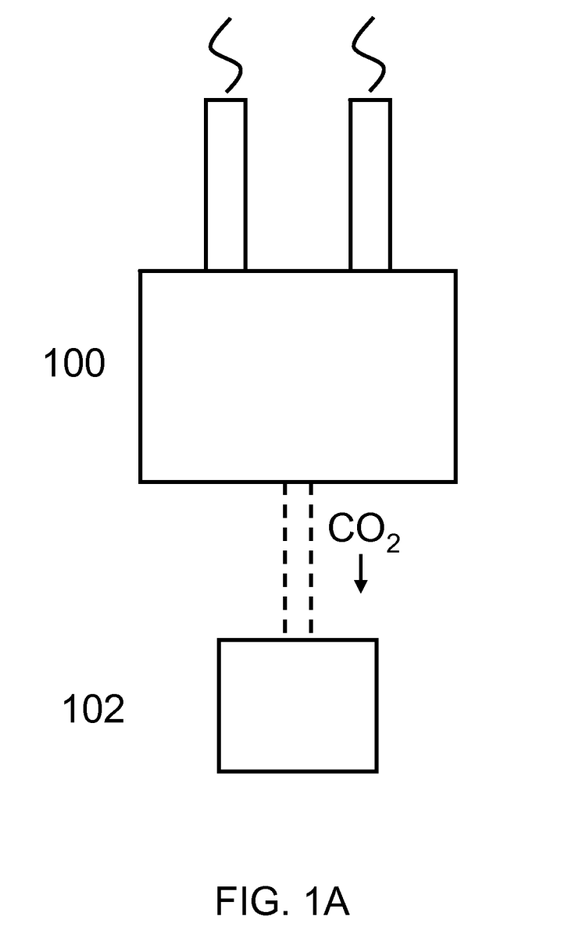
FIGS. 1A and 1B illustrate examples of industrial and waste facilities that can produce carbon dioxide and/or waste for processing in accordance with embodiments of the invention.

The methods and apparatuses in accordance with the present invention can be integrated into a variety of applications that involve carbon dioxide conversion and/or waste treatment. For example, FIG. 1A illustrates an industrial facility 100, such as a power plant, that produces carbon dioxide, which in a conventional configuration is likely to be emitted into the atmosphere. In an embodiment of the present invention, a processing substation 102 can be used to convert the carbon dioxide produced by the industrial facility 100. As depicted by the dashed lines, the industrial facility 100 and the processing substation 102 can be associated together by a variety of ways. For instance, carbon dioxide produced by the facility 100 can be collected on-site and directed into the substation 102 for conversion. In an alternative embodiment, the emitted carbon dioxide can be collected from the atmosphere and then converted in the processing substation 102.

Figure 1B:
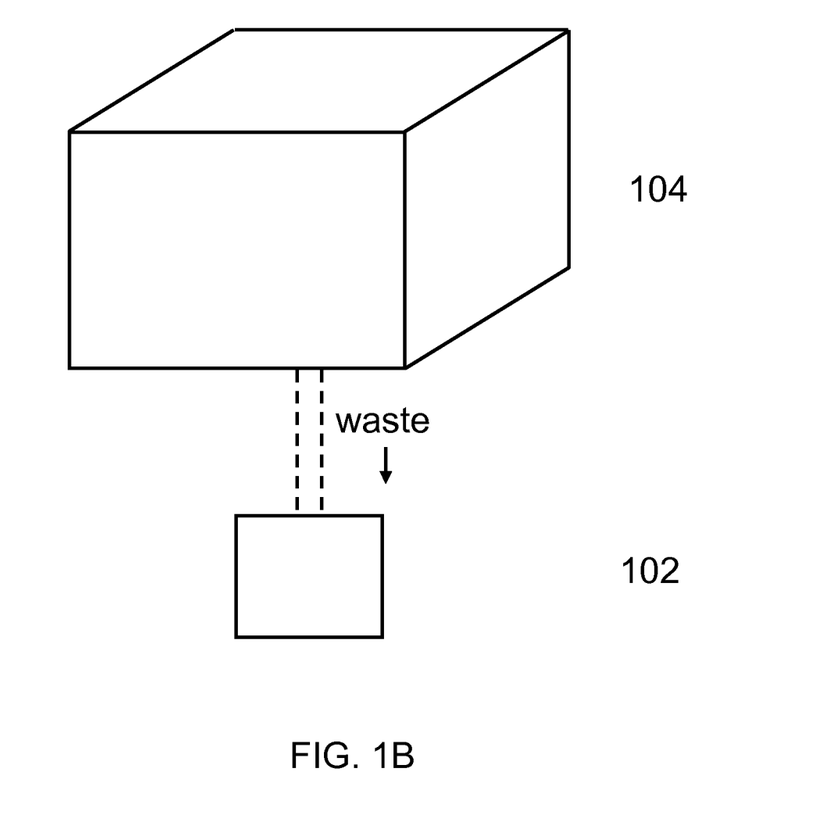

In an alternative embodiment, depicted in FIG. 1B, waste material (e.g., garbage, sewage, water sludge) is produced by a waste treatment plant 104. A processing substation 102 for treating the waste material and converting carbon dioxide can be associated with the waste treatment plant 104 by a variety of ways, as depicted by the dashed lines. For instance, waste material (e.g., solid or liquid) produced by the waste treatment plant 104 can be collected on-site and directed into the substation. Alternatively, the waste can be transported off-site and later processed in a processing station 102.

As further disclosed herein, methods and apparatuses in accordance with the present invention can also be incorporated into the processing station to convert carbon dioxide and/or treat waste material. In certain embodiments, carbon dioxide can be directed into a processing substation 102 to be converted into useful industrial materials and/or facilitate treating the waste material. One of ordinary skill will appreciate that there are various considerations and ways that carbon dioxide can be directed into the processing station 102, as shown in FIGS. 1A and 1B. For example, carbon dioxide may need to be further concentrated, solidified, liquefied, or purified prior to conversion by irradiation with a high energy electron beam. If a low concentration of carbon dioxide is used, reaction rates with a reactant may be sacrificed. Similarly, side reactions with contaminants, such as nitrous oxide, nitrogen, or oxygen could affect reaction yields for converting carbon dioxide to useful materials. Generally, however, it will be understood that carbon dioxide can be directed into the processing station in gaseous form, but it is contemplated that a given situation may call for carbon dioxide to be provided in solid form or in any other suitable physical state.

II. High Energy Electron Beams

As further described herein, embodiments of the invention may use a high energy electron beam to initiate reactions for converting carbon dioxide and treating waste. Electron beams ("EB") can be generated using techniques generally known in the art. For example, electron accelerators are commercially available as a source of high energy electron beams. In general, electrons generated by the electron beam can be provided as a diffuse or focused beam with an energy sufficient to initiate reactions upon irradiation with the beam. The high energy electron beams, e.g., can be provided with energies ranging from 500 KeV to 12 MeV. Depending on the application and the structural characteristics of the reaction apparatus, standard components, such as mirrors, reflectors, actuators, magnets, holes, slits and the like, can also be used for directing and/or shaping the electron beams. Furthermore, the electron beam can penetrate walls of solid materials such as plastics, ceramic, and thin light metals (e.g., aluminum, copper, zinc, steel, and the like). As such, the waste material treated with carbon dioxide can be transported or flowed in tubes or pipes made of such materials and the high energy electron beam can pass through the wall of the pipes or tubes to induce the desired process. The emitted gases that are a result of some of these processes, such as, e.g., methane, can also be contained within the tubing systems in a sealed process and then collected and stored as desired in specifically designed collection and storage containers or tanks for further use at the end of the process.

In some embodiments, the high energy electron beams can be used to initiate chemical reactions with carbon dioxide and/or radicals produced by irradiating carbon dioxide with high energy electrons. The high energy electron beam process can create highly energetic free radicals from the injected carbon dioxide, and thus activates the chemical activity of carbon dioxide. Some of the radicals can include carbon radicals, oxygen radicals, and carbon monoxide radicals. In addition, other radicals can be formed by other materials irradiated by the high energy electron beam.

III. General Reactions for Converting CO$_2$

In general, high energy electron beams can be used to initiate reactions in the gas phase, liquid, or solid phase. The reactions can produce reaction products that can be a gas, a liquid, and/or a solid. The character of reaction products will depend on the reaction conditions and reactants used. Illustrative gas phase reactions initiated by the high energy electron beam processes are described by the chemical equations below.

Equation 1 describes the creation of methane from carbon dioxide with the activation of high energy electron beams and with the injection of hydrogen.

$$CO_2 + 4H_2 \xrightarrow{EB} CH_4 + 2H_2O \quad \text{(Eq. 1)}$$

The 'EB' notation above the '→' sign designates the inclusion of the high energy electrons as a part of the chemical equation and reaction. In addition, a suitable, stable catalyst can also be used to provide a more effective process with higher conversion efficiencies. For example, catalysts can include metallic oxides such as copper oxide, aluminum oxide, with or without nickel, and any combination thereof. Other known catalysts can be based on precious or rare earth metals such as gold, platinum, rhodium, vanadium, chromium and compounds thereof.

Equations 2-4 describe, respectively, the conversion of carbon dioxide to form carbon monoxide, methanol and ethanol with the activation of high energy electron beams and with the injection of hydrogen.

$$CO_2 + 2H_2 \xrightarrow{EB} C + 2H_2O \quad \text{(Eq. 2)}$$

$$CO_2 + 3H_2 \xrightarrow{EB} CH_3OH + H_2O \quad \text{(Eq. 3)}$$

$$2CO_2 + 4H_2 \xrightarrow{EB} C_2H_5OH + H_2O \quad \text{(Eq. 4)}$$

As described above, the efficiency of the processes for converting the carbon dioxide to carbon monoxide, methanol or ethanol can be improved by known catalysts including metallic oxides (e.g., copper oxide, aluminum oxide, with or without nickel, and any combination thereof) or precious/rare earth metals (e.g., gold, platinum, rhodium, vanadium, chromium and compounds thereof). In these conversion processes described above, side products other than hydrocarbons can also be produced. The side products can include ethane and propane both of which are organic compounds that can be used in industrial applications.

IV. Reaction Apparatuses

In accordance with embodiments of the invention, a variety of apparatuses can be used to carry out the methods described herein for converting carbon dioxide and treating waste material. In certain embodiments, a reaction apparatus of the invention as disclosed herein can be included in the processing station 102 described in FIGS. 1A and 1B above for converting carbon dioxide and treating waste material.

Figure 2:
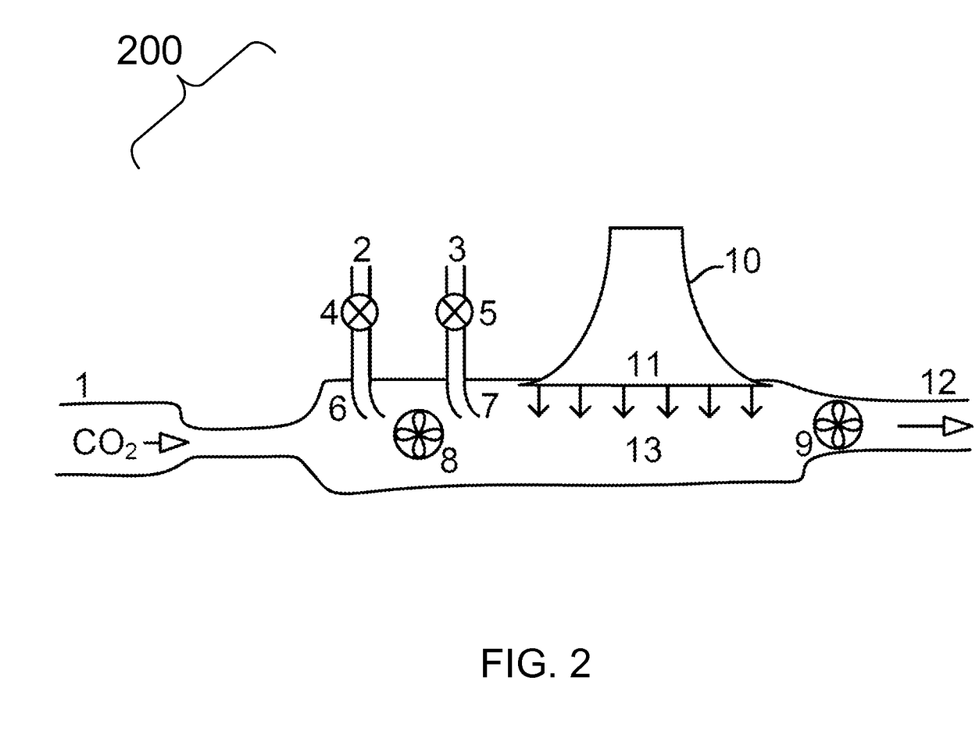
FIG. 2 illustrates an example of a reaction apparatus for converting carbon dioxide in accordance with embodiments of the invention.

FIG. 2 illustrates a reaction apparatus 200 for converting carbon dioxide in accordance with an embodiment of the invention. In certain embodiments, the reaction apparatus can be installed in the processing station 102 to process carbon dioxide and/or waste material. In an embodiment, the reaction apparatus can include an inlet port 1, material injection ports 2, 3, valves 4, 5, nozzles 6, 7, blowers or mixers 8, 9, a high energy electron beam generator 10 for generating high energy electron beams, a funnel 11, an outlet port 12, and a reaction chamber 13. In certain embodiments, a source of carbon dioxide is connected to the inlet port 1, so that carbon dioxide ($CO_2$) can be provided to the reaction chamber 13. Carbon dioxide can come from a variety of sources. For example, the source of carbon dioxide can be the carbon dioxide waste produced by the industrial facility 100 in FIG. 1A. In an alternative embodiment, carbon dioxide can be collected from the atmosphere and then provided to the reaction apparatus 200, which can also be included in the processing substation 102.

The material injection ports 2, 3 can be used for injecting materials that participate in a chemical reaction with carbon dioxide upon irradiation by the high energy electron beam. Embodiments of the invention can include connecting the injection ports 2, 3 to a source of aqueous solution or mixed slurry having a reactant. Alternatively, waste material produced by the waste treatment plant 104 can be connected to the material injection port 2, 3 to inject solid or liquid waste material. In an additional embodiment, gases, such as methane and/or ammonia, can be emitted from the solid or liquid waste material. These gases can be collected and then injected into the reaction apparatus 200 via the material injection ports 2, 3. The valves 4, 5 are provided to control, for example, the amount of material entering the material injection ports 2, 3 and flowing through the respective pipelines. The nozzles 6, 7 are provided at the end of the pipelines, illustrating where the materials are injected into the reaction chamber 13.

As illustrated in FIG. 2, the high energy electron beam generator 10 generates the high energy electron beams (indicated by arrows) which are then directed inside the reaction chamber 13. The blowers or mixers 8, 9 can be provided to mix, cool and facilitate flow of the reactants (carbon dioxide and material from the input side) into the reaction chamber 13 where the reactions occur and further facilitate the flow of reaction products toward the outlet port 12 for collection. The high energy electron beams can be directed by the funnel 11 to interact with the mixture of materials that flow under the high energy electron beam generator 10. It will be appreciated by one of ordinary skill in the art that the high energy electron beam can be positioned using any of a number of conventionally known techniques to focus and otherwise direct the electron beam to adequately irradiate the reactants that enter the reaction chamber 13. In addition, the high energy electron beam can be directed so as to continuously irradiate the reaction chamber or, optionally, the beam can be pulsed so that irradiation is intermittent over time.

Figure 3A:
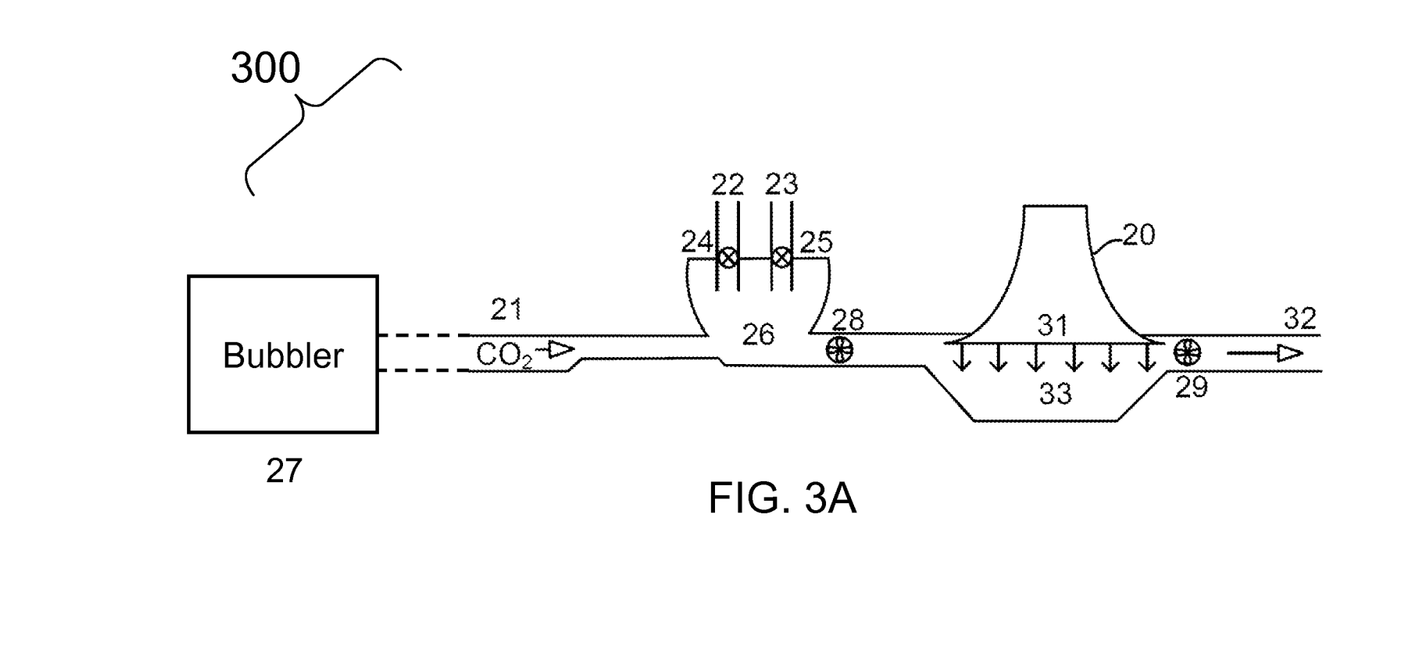
FIGS. 3A-3C illustrate examples of reaction apparatuses for converting carbon dioxide and solid and liquid waste in accordance with embodiments of the invention.

In another embodiment, FIG. 3A illustrates a reaction apparatus 300 for mixing carbon dioxide with an aqueous solution having a reactant. The reaction apparatus can include an inlet port 21, material injection ports 22, 23, valves 24, 25, a mixing chamber 26, mixing rotors 28, 29, a high energy electron beam generator 20, a funnel 31, an outlet port 32, and a reaction chamber 33. In certain embodiments, the carbon dioxide can be provided to the mixing chamber 26 via the inlet port 21 by bubbling carbon dioxide via a bubbler 27 into an aqueous solution in the mixing chamber 26. In an alternative embodiment, the bubbler 27 can be omitted. Instead, the carbon dioxide can be dissolved in a solution prior to being provided through the inlet port 21.

An aqueous solution or mixed slurry having a reactant used in the chemical reaction can be injected into the mixing chamber 26 via the material injection ports 22, 23. In an embodiment, the carbon dioxide can be bubbled before or after being introduced into the mixing chamber 26. The amount of the aqueous solution or mixed slurry that is provided into the mixing chamber 26 can be controlled by the valves 24, 25. The mixing rotor 28 can direct the mixture into the reaction chamber 33. The high energy electrons from the generator 20 can be directed by the funnel 31 to irradiate the aqueous carbon-dioxide containing reaction mixture and initiate a reaction among the materials present in the mixture, including carbon dioxide and the other components in the aqueous solution. The resulting reaction products, as well as any unreacted carbon dioxide and/or aqueous solution, mixed slurry or reactant, can then be removed from the reaction chamber 33 by the mixing rotor 29 and directed out the outlet port 32. It will be appreciated by one of ordinary skill in the art that the arrangement described above can be modified in ways generally known in the art. For example, the apparatus 300 alternatively may include only one chamber that is both a mixing chamber and a reaction chamber, wherein the high energy electron beam is positioned so as to irradiate the carbon dioxide and aqueous solution having a reactant to produce a reaction product. Also, other structures or methods can be used to direct the beam into the reaction apparatus.

Figure 3B:
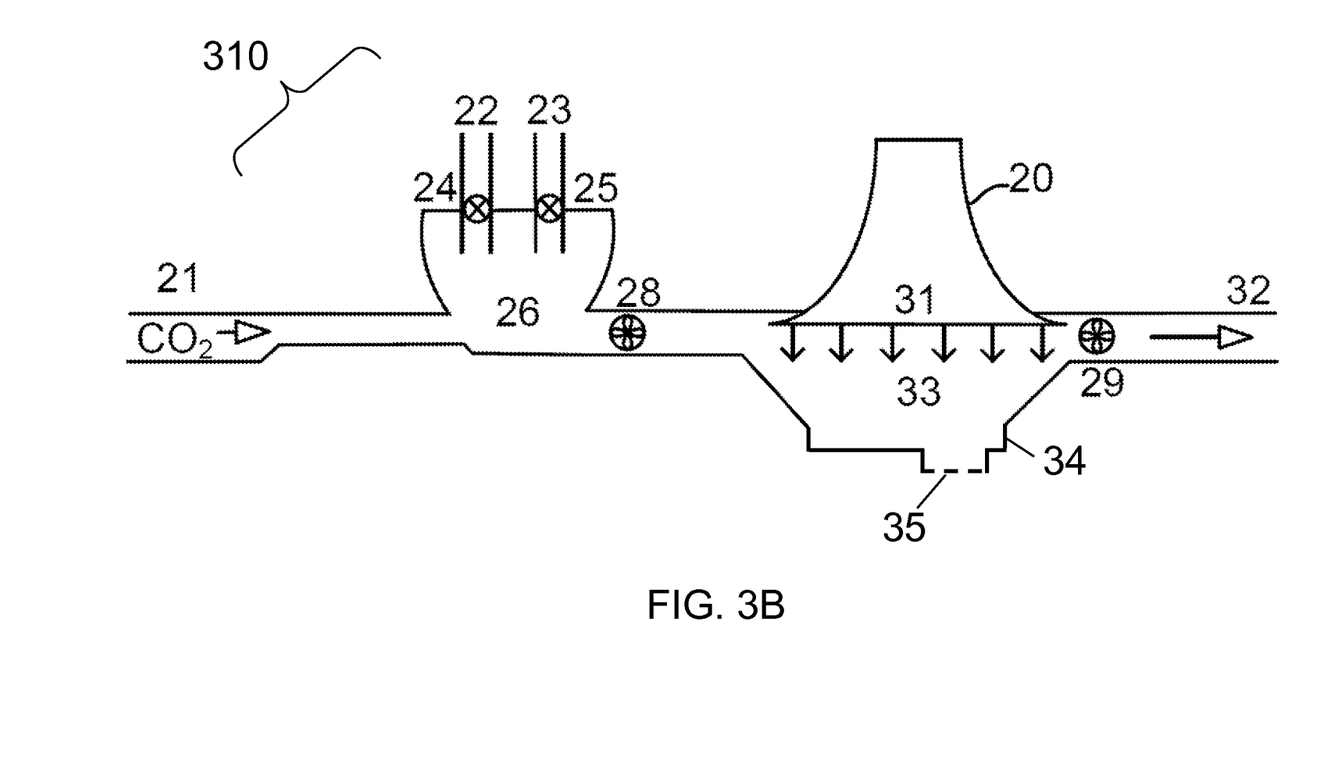

FIG. 3B illustrates an alternative embodiment 310 of the apparatus 300 shown in FIG. 3A that allows for collection of a reaction product formed after irradiation with the high energy electron beam. For example, the reaction apparatus can include a reservoir 34 that can also include an access port 35. The access port 35 can allow for removal of reaction product, for example, by scraping out solid reaction product that has precipitated out of solution or by allowing for a liquid reaction product to exit the chamber. It will be understood by one of ordinary skill in the art that the reaction product may require further processing, such as filtration or purification, following collection from the reaction apparatus. Furthermore, the arrangement of the reservoir 34 and the access port 35 described above can be modified in ways generally known in the art. For example, a reaction product can be dissolved in the aqueous solution within the reaction chamber, passed through the outlet port, and then later precipitated out of solution in a later processing step.

In yet another embodiment, the reaction apparatuses of FIGS. 3A and 3B can also be modified for treating solid or liquid waste material having a reactant. Solid or liquid waste material can be injected into the mixing chamber 26, and carbon dioxide can be provided into the inlet port 21. The mixing rotor 28 can direct the mixed carbon dioxide and waste material into the reaction chamber 33 for irradiation by the electron beam generator 20. Reaction products and the unreacted waste material can be directed out the outlet port 32 or, optionally, waste material and/or reaction product can be collected in the reservoir 34 and removed through the access port 35. In certain embodiments, the solid or liquid waste material can include a reactant that emits gas products when reacted with carbon dioxide upon irradiation with the electron beam 20. In such embodiments, and as a general rule, it may be preferable that the interior volume of the reaction apparatus (300 or 310) is not completely filled with solid or liquid waste material. Reserving some volume within the reaction chamber will allow for the production of gas byproducts, such as methane and/or ammonia, that may be emitted from treatment of the waste material. In another embodiment, the reaction apparatus may be provided with a pressure relief mechanism to allow for venting of gas byproduct.

Figure 3C:
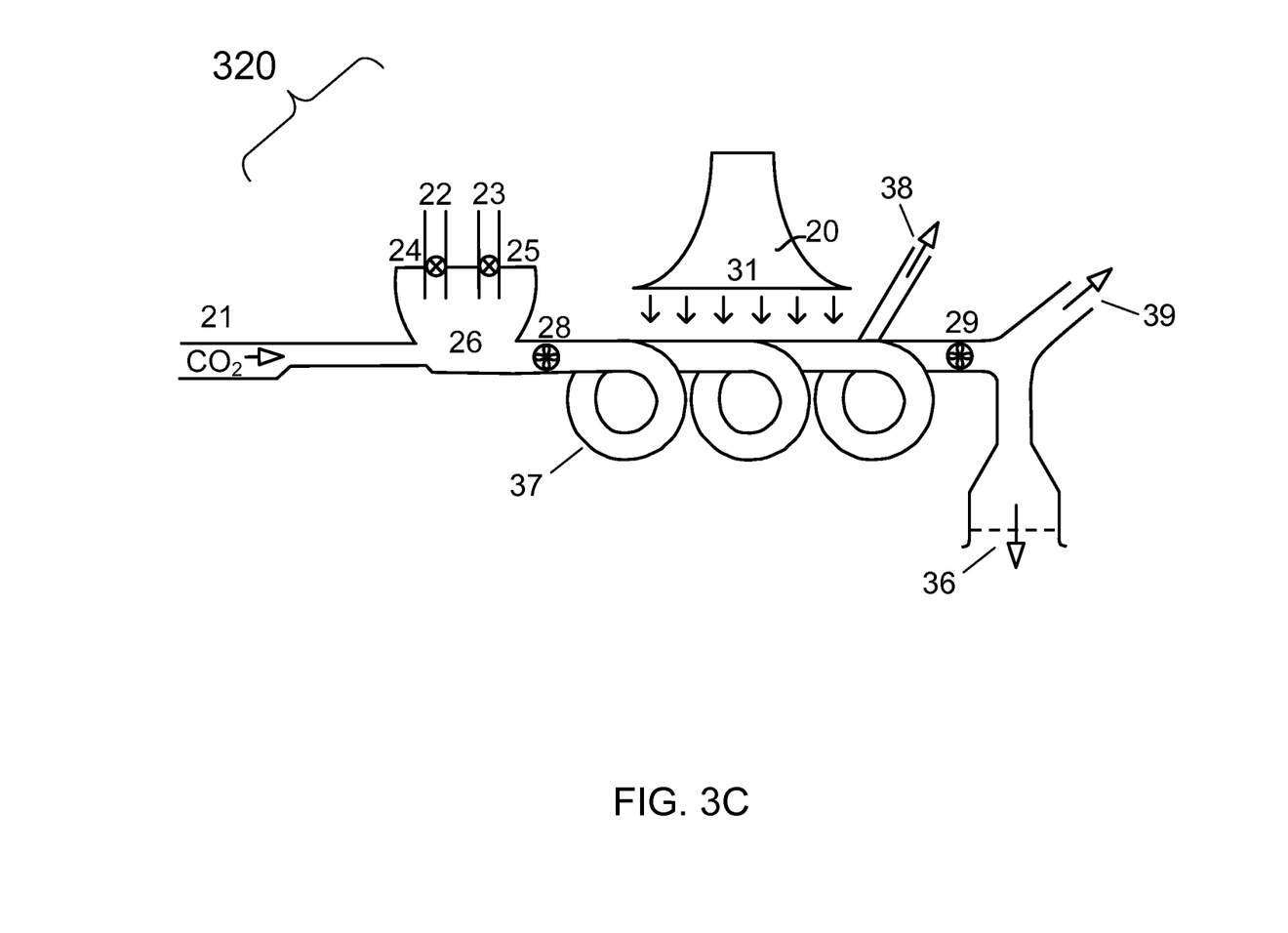

In yet another embodiment, FIG. 3C illustrates a reaction apparatus 320 for treating solid and/or liquid waste material and/or for converting carbon dioxide. Similar to the reaction apparatuses of FIGS. 3A and 3B, the reaction apparatus 320 can include an inlet port 21, material injection ports 22, 23, valves 24, 25, a mixing chamber 26, mixing rotors 28, 29, a high energy electron beam generator 20, and a funnel 31. The reaction apparatus 320 can also include a reaction chamber in the form of tubes or pipes 37 that can contain waste material or carbon dioxide flowing through the reaction apparatus. The tubes or pipes 37 can be made of a material through which the electron beams can penetrate, thereby allowing the electron beam-initiated treatment process to occur within the tubes or pipes 37. The tubes or pipes 37 can be coiled, e.g., in a helix, in the vicinity of the beam generator 20 to maximize exposure to the electron beam. In some embodiments, the reaction apparatus 320 can further include a gas exhaust 38. In certain embodiments, waste products produced by the electron beam irradiation can include gas, liquid, and/or solid byproducts. Gas byproducts can flow with the rest of the slurry in the tubes and can be directed out an outlet port 39. Solid and/or liquid byproducts can be collected through a collection port 36. One of ordinary skill in the art will appreciate that the tubes or pipes 37 can be coiled in any suitable manner other than in a helix to further increase exposure of the material flowing within the tubes or pipes to the electron beam. Furthermore, the collection port 36 and/or the gas exhaust 38 can be positioned in a variety of ways in relation to the tubes or pipes 37 and/or the outlet port 39.

In accordance with other embodiments, additional pipelines can be optionally provided to a reaction apparatus of the invention if the chemical reaction requires other materials (e.g., steam, catalyst) to produce a desired product. Also, a heating element can be added to the apparatuses of the invention, such as to the reaction chamber (13 or 33), to facilitate the chemical and physical reactions, and to improve the efficiency of the carbon dioxide conversion. For example, a heating element can be provided in the inlet port (1 or 21) and/or the material injection ports (2, 3, 22, 23). The heating element can be used to increase the temperature of the material provided in the reation chamber resulting in a hot mixture that can be more effective in triggering and sustaining the desired chemical reactions for the carbon dioxide conversion. Similarly, a cooling and/or compression apparatus can be provided in the apparatus, for example, in the reaction chamber or in the inlet ports (1 and 11) to liquify and/or solidify the carbon dioxide or other gaseous material as needed for improved chemical conversion.

Figure 4:
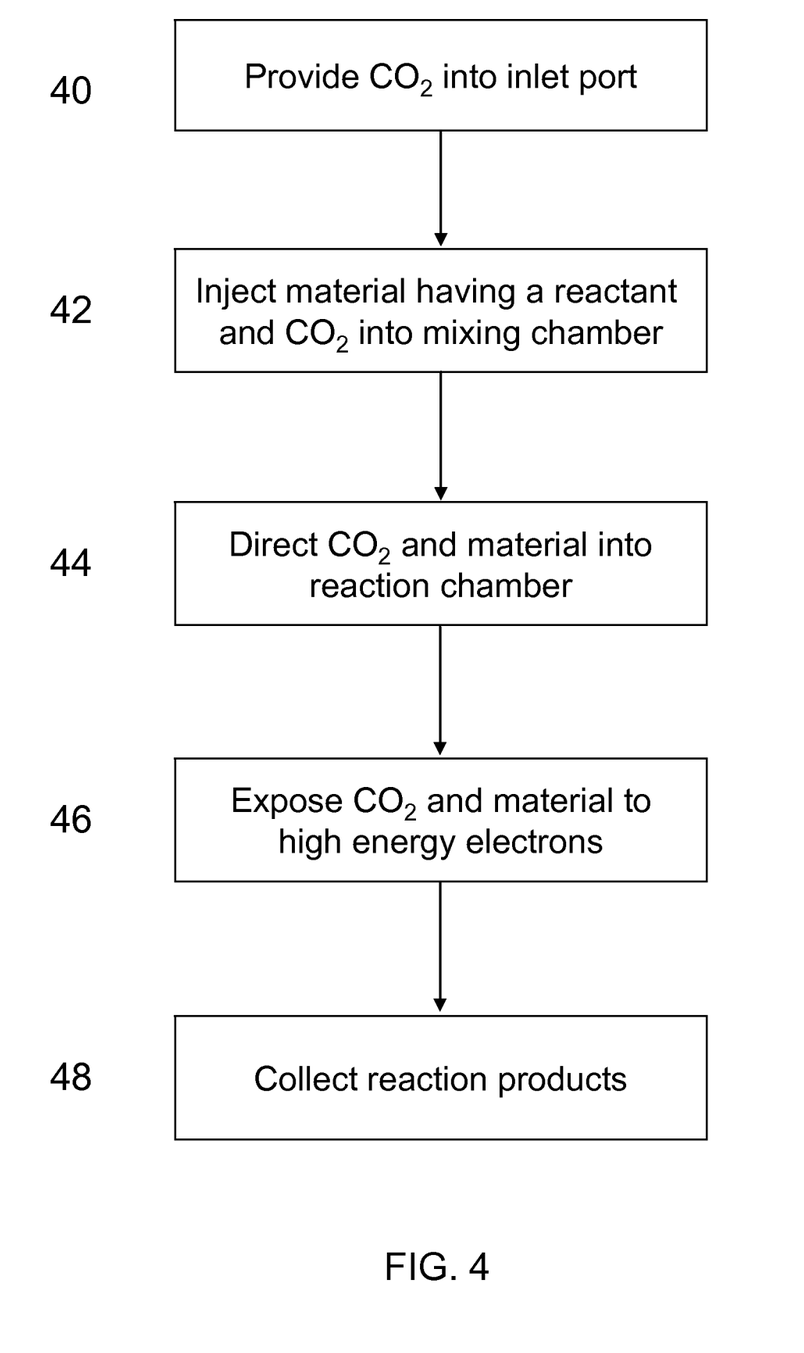
FIG. 4 provides a flow chart describing an example of method steps for converting carbon dioxide in accordance with embodiments of the invention.

In an embodiment of the invention, FIG. 4 illustrates a generalized method that can be carried out in a reaction apparatus of the invention. Carbon dioxide can be provided into the inlet port, step 40. Material having a reactant can be injected into a mixing chamber along with carbon dioxide, step 42. The injected material and carbon dioxide can be further directed into a reaction chamber at step 44 and then exposed to high energy electron beam radiation to initiate a reaction between the reactant of the material and the carbon dioxide, step 46. Reaction products can be collected, step 48.

V. Converting $CO_2$ in Aqueous Mixtures

Some embodiments of the invention can include combining carbon dioxide and an aqueous reaction solution having a reactant, such as a base, to form an aqueous reaction mixture. Typical bases include KOH, NaOH, $Ca(OH)_2$, $Mg(OH)_2$, $Ba(OH)_2$, and LiOH. The aqueous reaction mixture can then be subjected to a high energy electron beam in the manner discussed above to initiate a reaction between carbon dioxide and the reactant to form a reaction product, such as carbonate, bicarbonate, or a combination thereof.

Figure 5:
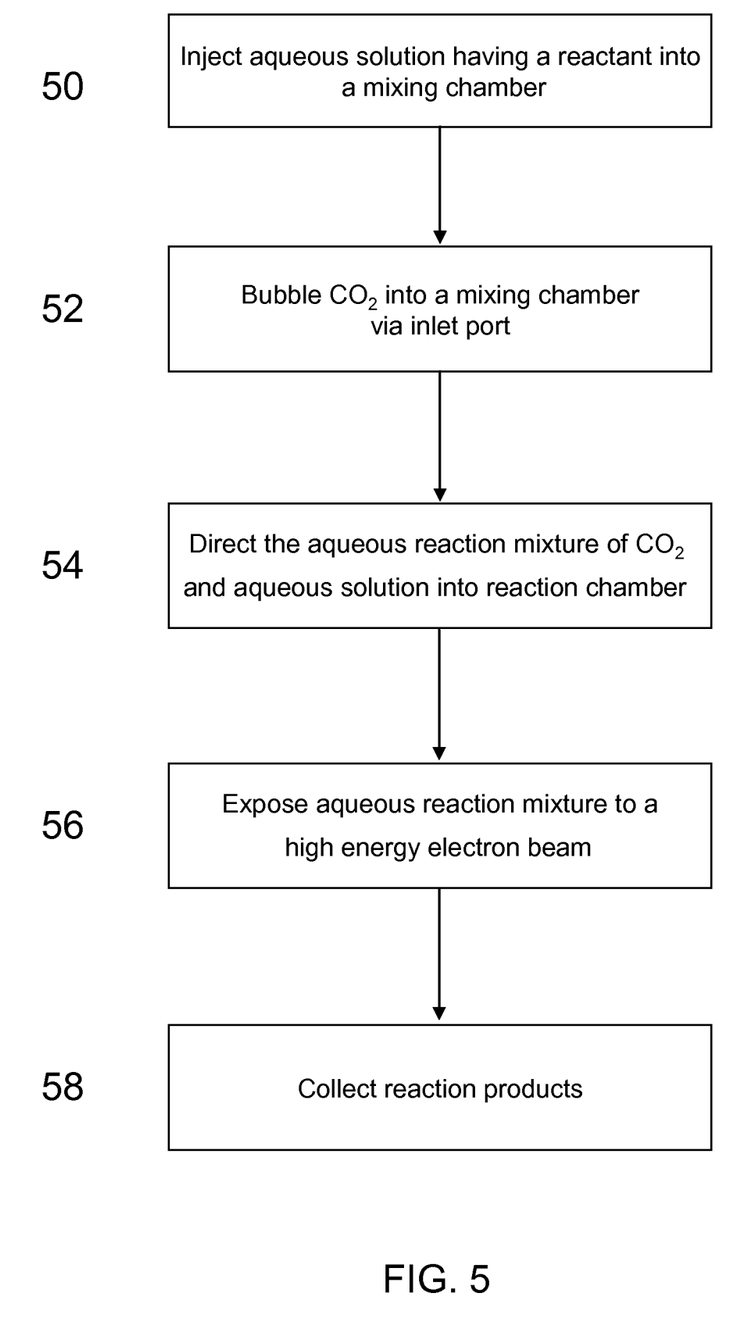
FIG. 5 provides a flowchart describing an example of a method of converting carbon dioxide by combination with an aqueous solution having a reactant in accordance with embodiments of the invention.

As illustrated in the flowchart of FIG. 5, aqueous solution having a reactant can be injected into a mixing chamber in a reaction apparatus of the invention, step 50. Carbon dioxide can be bubbled into the mixing chamber via an inlet port, step 52. An aqueous mixture of carbon dioxide and aqueous solution having a reactant can be directed into a reaction chamber, step 54. The aqueous mixture can then be exposed to a high energy electron beam, step 56. Reaction product can be collected, step 58.

In an embodiment of the present invention, a high energy electron beam can be used to convert carbon dioxide to products such as carbonate, bicarbonate, or a combination, where such products can be used in the chemical and fertilizer industries, or any other industry that uses such products as raw or intermediate materials. Examples of carbonate and bicarbonate compounds include potassium carbonate, sodium carbonate, calcium carbonate, sodium bicarbonate, potassium bicarbonate, etc. Carbon dioxide can also be converted to lithium carbonate for use in batteries, super-capacitors or a combination thereof to provide energy storage devices.

To produce carbonates and/or bicarbonates, the reaction apparatuses illustrated in FIGS. 2, 3A, 3B, and 3C can be modified to allow for bubbling of carbon dioxide into an aqueous solution or a mixed slurry having a base, such as KOH, to produce a reaction product, such as potassium carbonate ($K_2CO_3$). A variety of bases can be used. Typically, hydroxide bases are used, including KOH, NaOH, $Ca(OH)_2$, $Mg(OH)_2$, $Ba(OH)_2$, and LiOH. In one embodiment of the invention, carbon dioxide can be bubbled through sodium hydroxide (NaOH) in a water solution or a mixed slurry to produce sodium carbonate ($Na_2CO_3$) or sodium bicarbonate ($NaHCO_3$). In other embodiments, carbonates in the calcium family (e.g., $CaCO_3$, $MgCO_3$, $BaCO_3$, etc.) can also be produced. In yet other embodiments, reactions with KOH or LiOH can produce potassium or lithium, respectively.

The following chemical equations further describe such reactions initiated by the high energy electron beams.

$$CO_2 + 2NaOH \xrightarrow{EB} Na_2CO_3 + H_2O \quad (Eq.\ 5)$$

$$CO_2 + NaOH \xrightarrow{EB} NaHCO_3 \quad (Eq.\ 6)$$

The reactions illustrated in equations 5 and 6 produce sodium carbonate and sodium bicarbonate. In certain embodiments, it may be desirable to further provide reaction conditions, such as increased pressure and/or temperature, that can be used to increase reaction times and yields.

In yet another embodiment, a power plant or other industrial facility can emit ammonia ($NH_3$) that can be converted along with carbon dioxide to produce useful materials. Using the methods and/or apparatuses disclosed herein, the carbon dioxide and the ammonia can be captured, optionally combined with additional reactants, and then reacted to form a reaction product. For example, as indicated in equation 7 and referring to FIG. 3A, sodium chloride (NaCl) solution including water ($H_2O$) can be combined with the carbon dioxide and ammonia in the reaction apparatus 300. In one embodiment of the invention, the solution can be injected into the mixing chamber 26 and carbon dioxide and ammonia can be bubbled in through the inlet port 21 and an injection port (22 or 23), respectively. In another embodiment, the ammonia can be dissolved into the sodium chloride solution prior to injection into the reaction apparatus 300. In yet another embodiment, carbon dioxide and ammonia can be dissolved in the sodium chloride solution and then injected into the reaction apparatus 300. For example, carbon dioxide and ammonia can be captured and bubbled into an aqueous solution having sodium chloride. This solution can then be provided to the reaction apparatus 300 via the inlet port 21 or an injection port (22 or 23). It will be understood by one of ordinary skill in the art that a variety of ways are available for providing carbon dioxide and the ammonia to the reaction apparatus 300.

As illustrated in Equation 7, the sodium chloride solution, carbon dioxide, and ammonia can be exposed to a high energy electron beam to initiate a reaction to produce sodium bicarbonate and ammonium chloride ($NH_4Cl$).

$$CO_2 + NH_3 + NaCl + H_2O \xrightarrow{EB} NaHCO_3 + NH_4Cl \quad (Eq.\ 7)$$

One of ordinary skill in the art will appreciate that the reactions can be carried out with or without a catalyst. Furthermore, it is contemplated that other salts, such as $CaCl_2$ or $MgCl_2$, can be used in place of NaCl.

One of ordinary skill in the art will appreciate that the embodiments of the present invention can be carried out under a variety of reaction conditions that will depend on the reactants and solutions being used. Parameters such as flow rates, temperatures, pressures, solution and gas concentrations, and electron beam energies can also be tailored to maximize reaction rates and yields of the reaction products. Typical pressures are greater than about 3 atmospheres. Temperatures are typically less than about 90° C. To control the desired pressure and/or temperature, flow rates can be adjusted based on the geometry of the reaction chamber and/or tubes in the reaction apparatuses of the present invention.

VI. Treating Waste Material

In accordance with certain embodiments of the invention, solid or liquid waste material can be treated, for example, by combining carbon dioxide and a solid or liquid waste material having a reactant and then subjecting the carbon dioxide and solid or liquid waste material having a reactant to a high energy electron beam to initiate a reaction between the carbon dioxide and the reactant to form a reaction product. More particularly, a high energy electron beam activated process can, for example, be used to treat solid and/or liquid waste (e.g., garbage, sewage, water sludge, etc.). During a bio-digesting process (e.g., at waste treatment facilities or garbage dump sites), the waste material can emit methane and ammonia. The waste material can also include water, which can be reacted with, e.g., methane and carbon dioxide. Other materials, e.g., sodium chloride, can also be added to facilitate production of other reaction products for industrial or commercial use.

Figure 6:
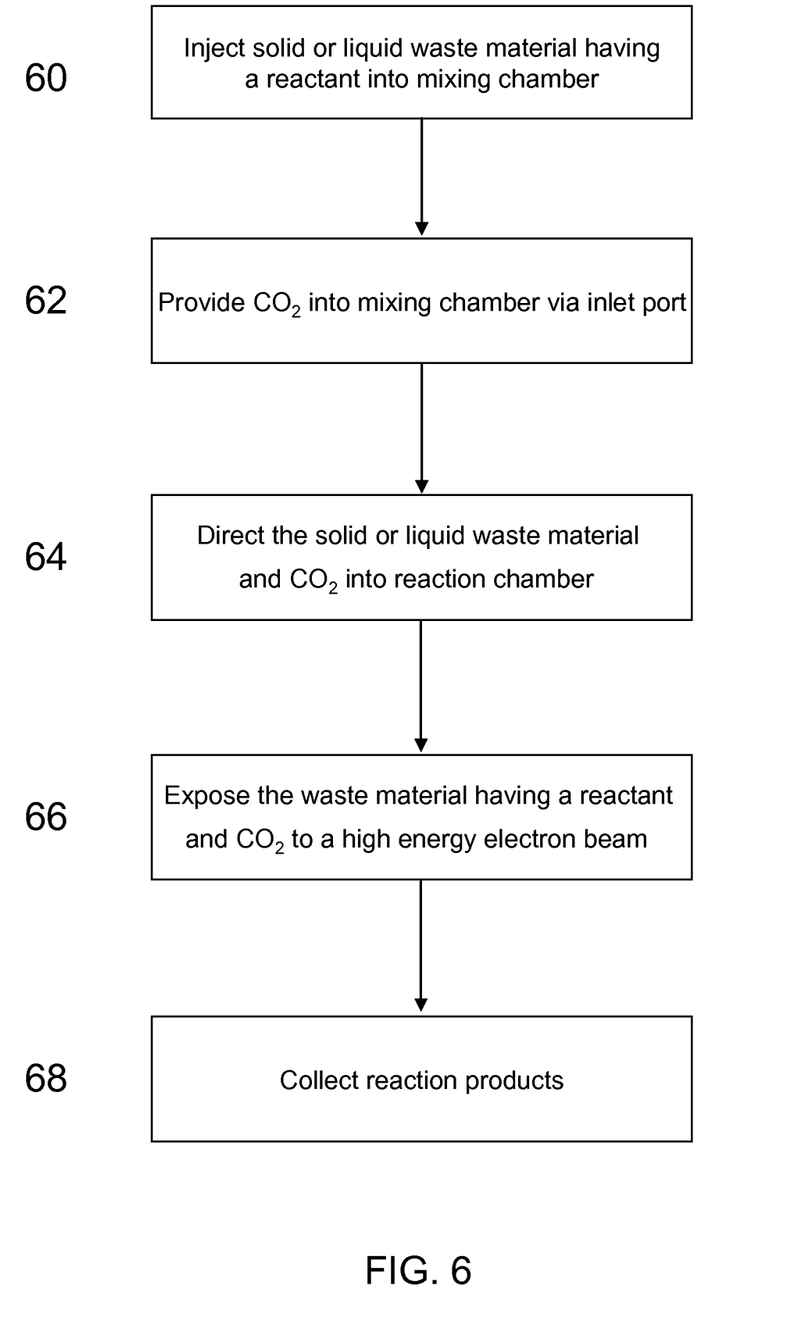
FIG. 6 provides a flowchart describing an example of a method for treating solid or liquid waste material in accordance with embodiments of the invention.

FIG. 6 illustrates an embodiment of treating waste material. Solid or liquid waste having a reactant can be injected into a mixing chamber in a reaction apparatus of the invention, step 60. Carbon dioxide can be provided into the mixing chamber via an inlet port, step 62. The solid or liquid waste material and carbon dioxide can be directed into a reaction chamber, step 64. The waste material having a reactant and carbon dioxide can be exposed to a high energy electron beam, step 66. Reaction products can then be collected, step 68.

In some embodiments, carbon dioxide and a solid or liquid waste material having a reactant can be provided to a reaction apparatus of the invention. A high energy electron beam reactor can be used to initiate a reaction between the reactant in the waste material, e.g., methane and/or ammonia, and the carbon dioxide to cause a chemical reaction resulting in a reaction product, such as methanol, ethanol, ammonium chloride, sodium carbonate and/or sodium bicarbonate. In accordance with the reaction apparatuses of the invention, the carbon dioxide can be provided via the inlet port and the solid or liquid waste can be injected into the mixing chamber via at least one injection port. If the waste material is a liquid, then carbon dioxide can optionally be bubbled into the liquid waste material or dissolved in gaseous form within the reaction apparatus.

Equation 8 illustrates an example of a reaction using high energy electron beams to convert carbon dioxide and waste material having water and methane into ethanol and oxygen.

$$CO_2 + CH_4 + H_2O \xrightarrow{EB} C_2H_5OH + O_2 \quad (Eq.\ 8)$$

By combining the equations 7 and 8, an optimal process of carbon dioxide abatement and for converting waste material to other useful industrial chemicals can be achieved, as illustrated in Equation 9.

$$2CO_2 + CH_4 + NH_3 + NaCl + 2H_2O \xrightarrow{EB} \quad \text{(Eq. 9)}$$
$$NaHCO_3 + NH_4Cl + C_2H_5OH + O_2$$

In accordance with the apparatus embodiments disclosed herein, one of ordinary skill will appreciate that the reaction products, for example, in Equations 8 and 9 can be collected directly from the reaction chamber or can be later separated using general separation techniques known in the art. For example, solid products can be in a form of dust or an emulsion that precipitates out of solution. Separation can be done by filtration, electrostatic precipitation, or with a centrifuge that collects the solid products out of the treated slurry.

What is claimed is:

1. An apparatus, comprising:
   an inlet port that receives carbon dioxide;
   a material injection port that receives an aqueous reaction solution, wherein the aqueous reaction solution has a reactant;
   a mixing chamber, wherein the inlet port is connected to the mixing chamber and the inlet port supplies the carbon dioxide to the mixing chamber, wherein the material injection port is connected to the mixing chamber and the material injection port supplies the aqueous reaction solution to the mixing chamber, and wherein the mixing chamber combines the carbon dioxide and the aqueous reaction solution to form an aqueous reaction mixture;
   a helical reaction chamber that comprises a pipe coiled in a helix, wherein the helical reaction chamber is connected to the mixing chamber, and wherein the helical reaction chamber receives the aqueous reaction mixture supplied from the mixing chamber; and
   a high energy electron beam generator that generates a high energy electron beam supplied directly onto the helical reaction chamber, wherein the high energy electron beam generator irradiates the aqueous reaction mixture within the helical reaction chamber, and wherein the high energy electron beam initiates a reaction between the carbon dioxide and the reactant in the aqueous reaction solution to form a reaction product.

2. The apparatus of claim 1, wherein the reactant in the aqueous reaction solution is a base selected from the group consisting of KOH, NaOH, Ca(OH)$_2$, Mg(OH)$_2$, Ba(OH)$_2$, and LiOH, and wherein the reaction product that is formed in the helical reaction chamber comprises a carbonate, a bicarbonate, or a combination of a carbonate and a bicarbonate.

3. The apparatus of claim 1, wherein the wherein the reactant in the aqueous reaction solution comprises ammonia and sodium chloride, and wherein the reaction product that is formed in the helical reaction chamber comprises sodium bicarbonate and ammonium chloride.

4. The apparatus of claim 1, wherein the high energy electron beam generated by the high energy electron beam generator has an energy between five-hundred kiloelectron volts and twelve megaelectron volts.

5. The apparatus of claim 4, wherein the high energy electron beam generator is configurable to continuously irradiate the aqueous reaction mixture within the helical reaction chamber, and wherein the high energy electron beam generator is also configurable such that the high energy electron beam is pulsed so that irradiation of the aqueous reaction mixture is intermittent over time.

6. The apparatus of claim 1, wherein a temperature within the helical reaction chamber is less than ninety degrees Celsius during the formation of the reaction product, and wherein a pressure within the helical reaction chamber is greater than three atmospheres during the formation of the reaction product.

7. The apparatus of claim 1, wherein the helical reaction chamber is of a material selected from the group consisting of: plastic, ceramic, and light metal.

8. The apparatus of claim 7, wherein the light metal is aluminum, copper, zinc or steel.

9. The apparatus of claim 1, wherein the reaction product that is formed in the helical reaction chamber includes gaseous reaction products, wherein the gaseous reaction products are supplied to a first outlet port connected to the helical reaction chamber, wherein the reaction product also includes liquid and solid reaction products, wherein the liquid and solid reaction products are supplied to a second outlet port connected to the helical reaction chamber.

10. An apparatus, comprising:
    an inlet port that receives carbon dioxide;
    a material injection port that receives a waste material that is solid or liquid, wherein the waste material has a reactant;
    a mixing chamber, wherein the inlet port is connected to the mixing chamber and the inlet port supplies the carbon dioxide to the mixing chamber, wherein the material injection port is connected to the mixing chamber and the material injection port supplies the waste material to the mixing chamber, and wherein the mixing chamber combines the carbon dioxide and the waste material to form a reaction mixture;
    a helical reaction chamber that comprises a pipe coiled in a helix, wherein the helical reaction chamber is connected to the mixing chamber, and wherein the helical reaction chamber receives the reaction mixture supplied from the mixing chamber; and
    a high energy electron beam generator that generates a high energy electron beam, wherein the high energy electron beam generator irradiates the reaction mixture only within the helical reaction chamber, and wherein the high energy electron beam initiates a reaction between the carbon dioxide and the reactant in the waste material to form a reaction product.

11. The apparatus of claim 10, wherein the reactant in the waste material is methane, and wherein the reaction product that is formed in the helical reaction chamber comprises ethanol and oxygen.

12. The apparatus of claim 10, wherein the reactant in the waste material includes methane, ammonia, and sodium chloride, and wherein the reaction product that is formed in the helical reaction chamber comprises sodium bicarbonate, ammonium chloride and ethanol.

13. The apparatus of claim 10, wherein the helical reaction chamber is of a material selected from the group consisting of: plastic, ceramic, and light metal.

14. The apparatus of claim 13, wherein the light metal is aluminum, copper, zinc or steel.

15. The apparatus of claim 10, wherein the reaction product that is formed in the helical reaction chamber includes gaseous reaction products, wherein the gaseous reaction products are supplied to a first outlet port connected to the helical reaction chamber, wherein the reaction product also includes liquid and solid reaction products, wherein the liquid and solid reaction products are supplied to a second outlet port connected to the helical reaction chamber.

16. The apparatus of claim 10, wherein the high energy electron beam generated by the high energy electron beam generator has an energy between five-hundred kiloelectron volts and twelve megaelectron volts.

17. The apparatus of claim 10, wherein the high energy electron beam generator is configurable to continuously irradiate the reaction mixture within the helical reaction chamber, and wherein the high energy electron beam generator is also configurable such that the high energy electron beam is pulsed so that irradiation of the reaction mixture is intermittent over time.

18. An apparatus, comprising:
an inlet port that receives carbon dioxide;
a material injection port that receives a material having a reactant, wherein the material is solid, liquid or combination of solid and liquid;
a helical reaction chamber that comprises a pipe coiled in a helix, wherein the helical reaction chamber receives the carbon dioxide from the inlet port and also receives the material from the material injection port, wherein the helical reaction chamber combines the carbon dioxide and the material to form a reaction mixture, and wherein the helical reaction chamber is the only chamber of the apparatus; and
a high energy electron beam generator that generates a high energy electron beam, wherein the high energy electron beam generator irradiates the reaction mixture within the helical reaction chamber, and wherein the high energy electron beam initiates a reaction between the carbon dioxide and the reactant in the material to form a reaction product.

19. The apparatus of claim 18, wherein the material is an aqueous reaction solution, wherein the reactant is a base selected from the group consisting of KOH, NaOH, $Ca(OH)_2$, $Mg(OH)_2$, $Ba(OH)_2$, and LiOH, and wherein the reaction product that is formed in the helical reaction chamber comprises a carbonate, a bicarbonate, or a combination of a carbonate and a bicarbonate.

20. The apparatus of claim 18, wherein the material is an aqueous reaction solution, wherein the reactant comprises ammonia and sodium chloride, and wherein the reaction product that is formed in the helical reaction chamber comprises sodium bicarbonate and ammonium chloride.

21. The apparatus of claim 18, wherein the reactant is methane, and wherein the reaction product that is formed in the helical reaction chamber comprises ethanol and oxygen.

22. The apparatus of claim 18, wherein the reactant comprises methane, ammonia, and sodium chloride, and wherein the reaction product that is formed in the helical reaction chamber comprises sodium bicarbonate, ammonium chloride and ethanol.

23. The apparatus of claim 18, wherein the helical reaction chamber is of a material selected from the group consisting of: plastic, ceramic, and light metal.

24. The apparatus of claim 23, wherein the light metal is aluminum, copper, zinc or steel.

25. The apparatus of claim 18, wherein the high energy electron beam generated by the high energy electron beam generator has an energy between five-hundred kiloelectron volts and twelve megaelectron volts.

26. The apparatus of claim 25, wherein the high energy electron beam generator is configurable to continuously irradiate the reaction mixture within the helical reaction chamber, and wherein the high energy electron beam generator is also configurable such that the high energy electron beam is pulsed so that irradiation of the reaction mixture is intermittent over time.

* * * * *